May 3, 1938.   R. H. NEWTON   2,115,742
MIXING
Filed Sept. 10, 1936   4 Sheets-Sheet 1

Roger H. Newton
INVENTOR

BY Arthur L. Davis
ATTORNEY

May 3, 1938. R. H. NEWTON 2,115,742
MIXING
Filed Sept. 10, 1936 4 Sheets-Sheet 3

Roger H. Newton
INVENTOR

BY Arthur L. Davis
ATTORNEY

May 3, 1938.  R. H. NEWTON  2,115,742
MIXING
Filed Sept. 10, 1936    4 Sheets-Sheet 4

Roger H. Newton
INVENTOR

BY Arthur F. Davis
ATTORNEY

Patented May 3, 1938

2,115,742

UNITED STATES PATENT OFFICE 2,115,742

MIXING

Roger H. Newton, near Sheffield, Ala.

Application September 10, 1936, Serial No. 100,147

8 Claims. (Cl. 259—102)

(Granted under the act of March 3, 1883, as amended April 30, 1928; 370 O. G.)

This application is made under the Act of March 3, 1883, as amended by the Act of April 30, 1928, and the invention herein described, if patented, may be manufactured and used by or for the Government for governmental purposes without the payment to me of any royalty thereon.

This invention relates to a process of and an apparatus for mixing liquid, solid or liquid and solid materials.

One of the objects of this invention is to provide a method for very rapid and continuous mixing of various materials, particularly liquid and finely divided solid materials. Another object of this invention is to provide an effective means for mixing materials which pass from a fluid through a plastic into a solid state very shortly after initial mixing. Other objects of this invention include the provision of an apparatus in which the essential mixing elements are continuously mutually wiped off in order to prevent building up of physical or chemical reaction mixtures on their surface.

I have discovered a process and apparatus for effecting the objects of this invention. In the process for carrying out my invention the materials are mixed by driving vertical, rotating blades so that each blade passes adjacent to the shell of the mixer, adjacent to the center of the cross section of the shell, and adjacent to at least one side of an affixed blade with each rotating blade forming a looped epitrochoidal path, with the cross sections of all the blades in one complete cycle, substantially covering the cross section of the mixing zone except that occupied by the affixed blades in the base of the mixing zone. In the apparatus for carrying out my process the rotating blade assembly is affixed to the shaft of an epicycloidal gear, with the shell base and its affixed blades remaining stationary, or the rotating blade assembly is affixed to the shaft of a driven gear which has a fixed center, with the shell mounted on a rotating base, to which is attached the fixed blades within the shell rotating in a direction opposite to the driven gear but with exactly the same speed.

Figure 1:
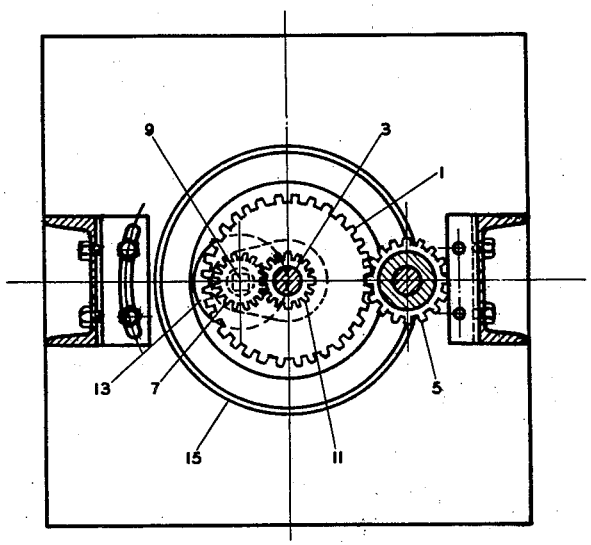
Figure 2:
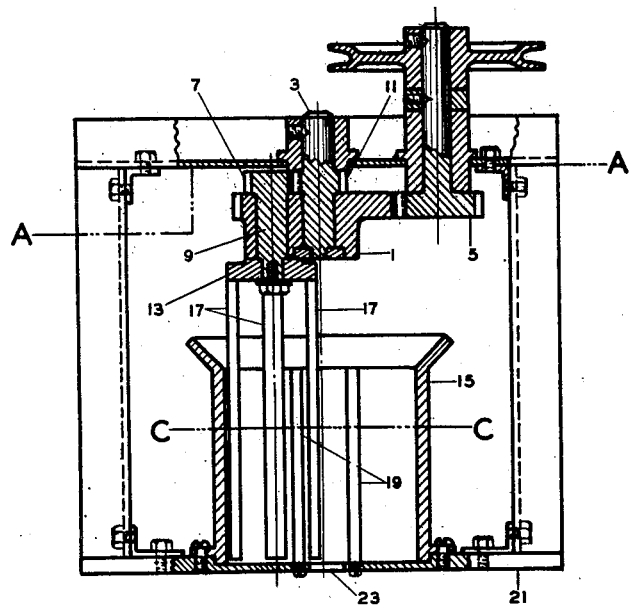
Figure 3:
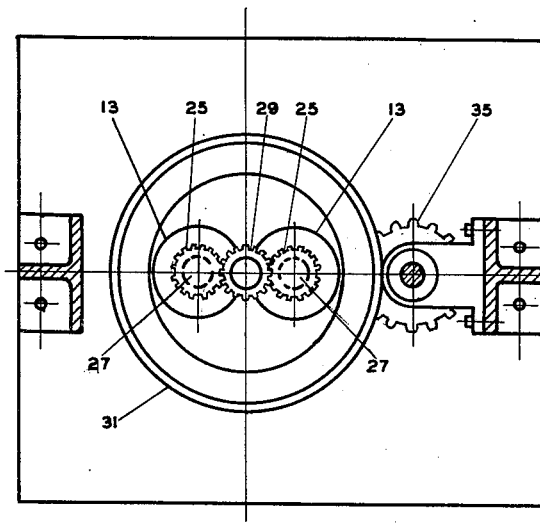
Figure 4:
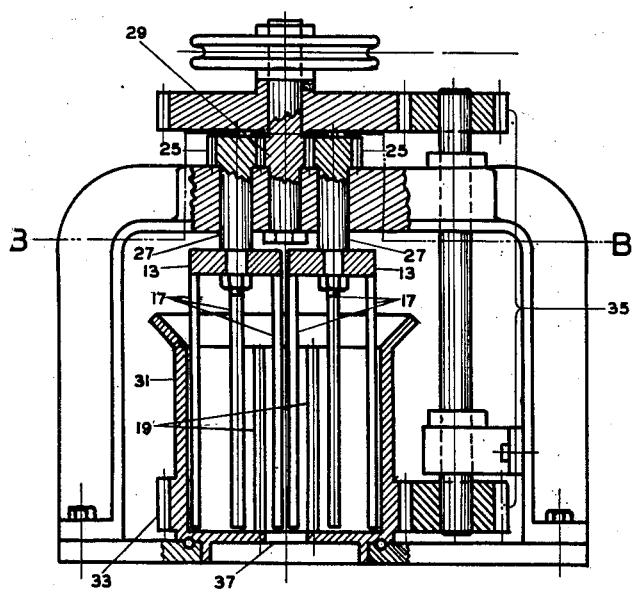
Figure 5:
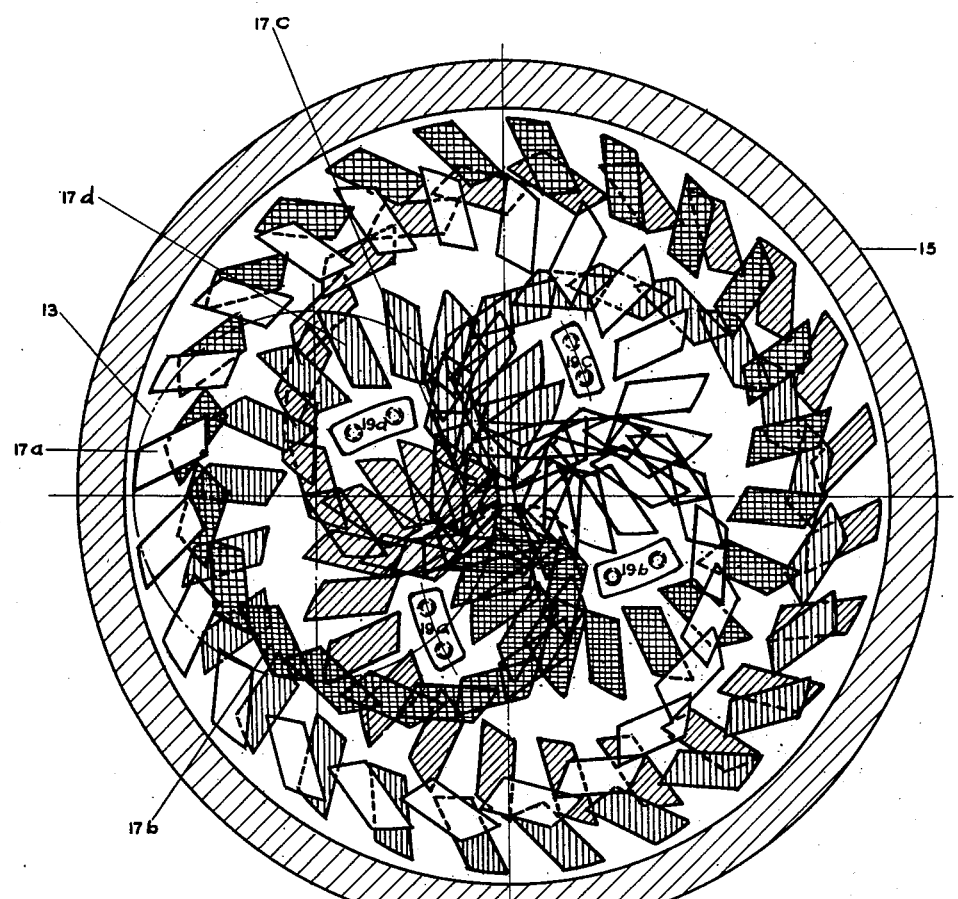
Figure 6:
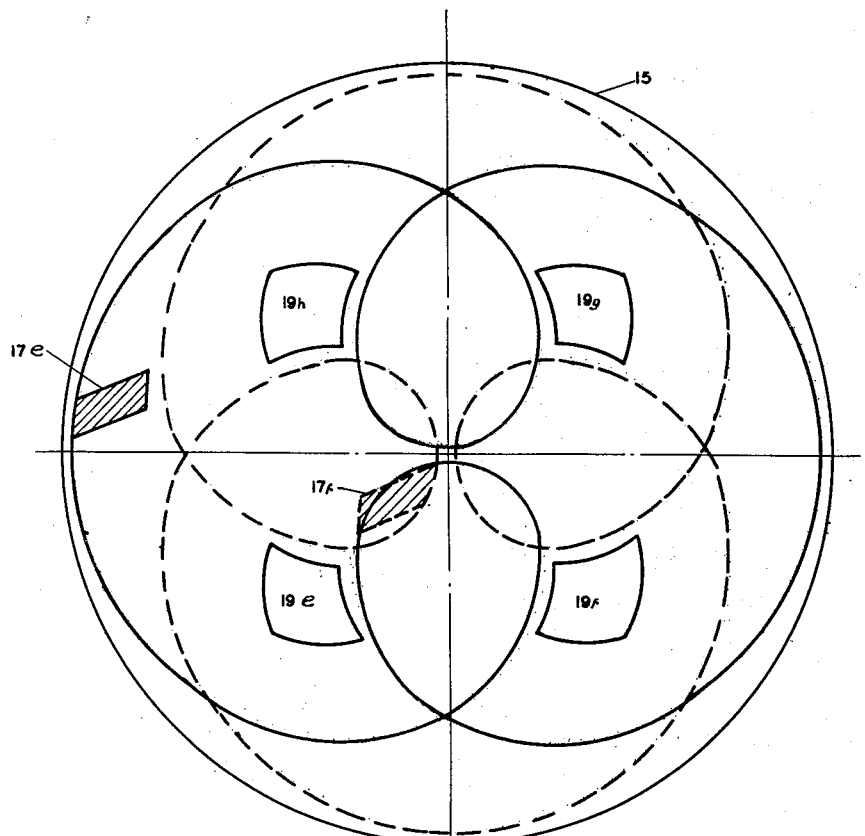

In the accompanying drawings, which form a part of the specification, and wherein reference symbols refer to like parts whenever they occur, Fig. 1 is a diagrammatic, sectional plan view of one form of apparatus for the embodiment of my invention taken through A—A of Fig. 2 in which the fixed gear and the epicycloidal gear are the same size and the cylindrical shell, base and the fixed blades are stationary, Fig. 2 is a diagrammatic, vertical, sectional view of Fig. 1, Fig. 3 is a diagrammatic, sectional, plan view of another form of apparatus for the embodiment of my invention taken through B—B of Fig. 4 in which the driving gear and the driven gears are the same size and the cylindrical shell and the base with its affixed blades rotate, Fig. 4 is a diagrammatic, vertical, sectional view of Fig. 3, Fig. 5 is a diagrammatic, sectional, plan view through C—C of Fig. 2 showing in detail the paths of the respective rotating blades in relation to the shell and blades affixed to the base, and Fig. 6 is a diagrammatic view of the path of the leading edge of two rotating blades where the number of teeth in the stationary gear is twice the number of teeth in the epicycloidal gear.

In Fig. 1, gear 1, rotating on affixed shaft 3, is driven by pinion 5. The epicycloidal gear 7, affixed to a shaft 9, in the driven gear 1, rotates about the stationary gear 11, which is affixed to the stationary shaft 3. The vertical blade assembly 13, is affixed to the epicycloidal gear shaft 9. The cylindrical shell 15, is shown adjacent to the external path of the blades in the assembly 13.

In Fig. 2, there is shown in addition to those elements included in Fig. 1, the rotating blades 17, of the vertical blade assembly 13, the vertical stationary blades 19, affixed to the base 21, in which is located the discharge outlet 23.

In Fig. 3, the gears 25, on the shafts 27, which have fixed centers are driven by gear 29. The vertical blade assemblies 13, carrying the rotating blades are affixed to the driven gear shafts 27. The cylindrical shell 31, is attached to a rotating base 33, which is driven by the assembly 35, in the same direction and at exactly the same speed as the driving gear 29.

In Fig. 4 there is shown, in addition to those elements included in Fig. 3, the rotating blades 17, of the vertical blade assemblies 13, the vertical blades 19, affixed to the rotating base 33, and the outlet 37 for the discharge of materials after mixing.

In Fig. 5, the vertical blade assembly 13, with the rotating blades 17, were specifically identified as 17a, 17b, 17c, and 17d, is shown in an initial starting position. The respective positions of these rotating blades along their respective looped epitrochoidal paths are shown for 10 degree intervals, as well as the relative relationship between the paths of the respective rotating blades 17, the cylindrical shell 15, and the vertical stationary blades 19, specifically identified as 19a, 19b, 19c, and 19d.

In Fig. 6 the rotating blade assembly is shown with only two rotating blades 17, specifically identified as 17e and 17f. Since the number of teeth in the stationary gear is twice the number of teeth in the epicycloidal or driven gear, then the path described by the leading edge of the rotating blades 17e and 17f, respectively, each describes a double looped epitrochoid. Even though the entire paths of the cross section of the rotating blades 17e and 17f are not shown, this figure shows the relation of the outside of the respective paths to the cylindrical shell 15, and to the blades 19, specifically identified as 19e, 19f, 19g, and 19h, which are affixed to the base of the mixer.

One example of the operation of my process and apparatus is given for mixing fine phosphate rock and concentrated phosphoric acid in the production of monocalcium phosphate. The mixer used was constructed exactly as disclosed in Fig. 1 and Fig. 2. The cylindrical shell was 6 inches in diameter and 6 inches deep. The epicycloidal gear was operated at 150 R. P. M. Phosphoric acid containing 70 per cent by weight of $H_3PO_4$ and fine phosphate rock containing 28.5 per cent $P_2O_5$ were used. The phosphoric acid and the fine phosphate rock were charged into the mixer continuously at the rate of 4.5 tons of the acid and 3.0 tons of the rock per hour. The resulting mixture was continuously withdrawn through the outlet in the bottom of the mixer. The mixture so obtained exhibited characteristics which indicated that a more intimate mixture had resulted than it had been hitherto possible to attain in such a short period of mixing in continuous operation and with relatively inexpensive apparatus.

It is believed obvious from the results given in the above example that even in the small-scale apparatus very effective mixing has been obtained. It is to be pointed out, however, in connection with the particular materials used in the example that such effectiveness in mixing would not have been possible were it not for the fact that the inside of the cylindrical shell, the rotating blades, and the fixed blades were continuously and thoroughly kept free from any portions of the resulting mixture, which otherwise would have set up concretely on the surfaces to which it was attached, had it not been so positively removed while in a fluid condition.

It is evident that there are numerous factors which will influence conditions for the most satisfactory operation of my invention, the actual limits of which cannot be established except by a detailed study of each set of raw materials and all the conditions involved.

It will be observed that the various individual points on the rotating blades describe a looped epitrochoidal path in all cases which have been effective in carrying out my invention. In describing an epitrochoid, it is necessary to refer to the fixed circle, a rolling circle, and a tracing point on a tracing circle. This may be a convenient means of reference, even though these specific elements may be referred to in terms of parts of apparatus. For instance, when the fixed circle and the rolling circle are represented by gears of equal size and equal number of teeth and with the leading edge of a blade of the rotating blade assembly representing the tracing point on the tracing circle, then the curve described by one complete cycle of this tracing point is a single looped epitrochoid. Likewise the epicycloidal gear may have one-half the number of the same size teeth as existed on the stationary gear, then the curve described by the leading edge of the blade which corresponds to the tracing point on the tracing circle is the double looped epitrochoid. Similarly, other small integer ratios for these particular gears will cause the resulting paths to be other types of looped epitrochoids.

It seems to be necessary that there be a minimum of two blades in the rotating assembly, although it is obvious that a larger number may be used and undoubtedly more satisfactorily. In apparatus actually constructed a minimum of four rotating blades has been thus far used.

A very essential element of this invention lies in the discovery of the necessity for blades affixed to the base of the mixer and so located adjacent to the epitrochoidal paths of the blades of the rotating assembly that mutual wiping action is effected which cleans the affixed blades, the rotating blades and the inside of the shell of the mixer free from accumulated portions of solid material after mixing. The number of blades affixed to the bottom of the mixer should be at least equal to the number of the paths described by the blades of the rotating blade assembly or assemblies. Ordinarily, for one rotating assembly of four blades or two assemblies of four blades each, in which the paths of travel of the blades of the second assembly are identical to the first, the minimum of four affixed blades is used. However, under certain circumstances four more affixed blades of proper size and shape may be inserted in those portions of the horizontal cross section of the mixer which is not traversed by blades of the rotating blade assembly or assemblies.

Another modification of my apparatus which is used in order to obtain effects substantially identical to those first described may be obtained by changing the epicycloidal gear with the rotating blade assembly attached to its shaft, to an assembly in which the gear merely revolves on a shaft with a fixed center. At the same time it is necessary that the shell be affixed to a rotatable base, on which are affixed the other vertical blades, and this entire latter assembly must be rotated counter to the direction of rotation of the assembly rotating above but at the same time at exactly the same speed as the assembly which rotates from above. It will be seen that by means of this arrangement the motion of the rotating blades relative to the position of the fixed blades is such that looped epitrochoidal paths are still formed relative to the positions of the blades affixed to the rotating base.

The speed of rotation of the rotating blade assembly or assemblies depends materially upon the size of the mixer and the corresponding size of this assembly. In apparatus already constructed and operated, it has been found that a speed of 100 to 200 revolutions per minute is satisfactory for accomplishing adequate mixing in a minimum period of time. Undoubtedly higher speeds may be used and smaller equipment, and lower speeds may be required for substantially larger equipment. In any event, the actual linear motion of the respective blades will remain substantially the same.

It will be seen, therefore, that this invention actually may be carried out by the modification of certain details without departing from its spirit or scope.

I claim:

1. In an apparatus for mixing materials, the combination which comprises a receptacle with cylindrical side wall, a base affixed to the bottom of the side wall, and an outlet through the base; four stationary blades affixed to the base of the receptacle and uniformly spaced between the vertical axis and the side wall of the receptacle; a rotating blade assembly comprised of four vertical blades; and a means for supporting and driving the rotating blade assembly such that in one complete cycle of the assembly each of the vertical blades thereof moves in a looped epitrochoidal path, as an inscribed projection upon the base of the receptacle; with the stationary blades of such a size and shape and so positioned within the looped epitrochoidal paths of the rotating vertical blades, and the rotating vertical blades of such a size and shape and so positioned that in one complete cycle of the rotating vertical blades in their looped epitrochoidal paths, the cross sections of all of the rotating blades cover substantially all the cross section of the interior of the cylindrical receptacle except that occupied by the stationary blades.

2. In an apparatus for mixing materials, the combination which comprises a receptacle with cylindrical side wall, a base fixed to the bottom of the side wall, and an outlet through the base; a plurality of stationary blades affixed to the base of the receptacle and uniformly spaced between the vertical axis and the side wall of the receptacle; a rotating blade assembly comprised of a plurality of vertical blades; a means for supporting and driving the rotating blade assembly such that in one complete cycle of the assembly each of the vertical blades thereof moves in a looped epitrochoidal path as, an inscribed projection upon the base of the receptacle; with the stationary blades of such a size and shape and so positioned within the looped epitrochoidal paths of the rotating vertical blades, and the rotating vertical blades of such a size and shape and so positioned that in one complete cycle the rotating vertical blades in their looped epitrochoidal paths pass adjacent to both the stationary blades and the side wall of the receptacle.

3. In an apparatus for mixing materials, the combination which comprises a receptacle with cylindrical side wall, a base affixed to the bottom of the side wall, and an outlet through the base; four stationary blades affixed to the base of the receptacle and uniformly spaced between the vertical axis and the side wall of the receptacle; a plurality of rotating blade assemblies, each assembly comprised of four vertical blades; and a means for supporting and driving each of the rotating blade assemblies such that in one complete cycle of each assembly each of the vertical blades thereof moves in a looped epitrochoidal path, as an inscribed projection upon the base of the receptacle; with the stationary blades of such a size and shape and so positioned within the looped epitrochoidal paths of the rotating vertical blades, and the rotating vertical blades of such a size and shape and so positioned that in one complete cycle of the rotating vertical blades in their looped epitrochoidal paths the cross sections of all of the rotating blades cover substantially all the cross section of the interior of the cylindrical receptacle except that occupied by the stationary blades.

4. In an apparatus for mixing materials, the combination which comprises a receptacle with cylindrical side wall, a base affixed to the bottom of the side wall, and an outlet through the base; a plurality of stationary blades affixed to the base of the receptacle and uniformly spaced between the vertical axis and the side wall of the receptacle; a plurality of rotating blade assemblies with each assembly comprised of a plurality of vertical blades; and a means for supporting and driving each of the rotating blade assemblies such that in one complete cycle of each assembly each of the vertical blades thereof moves in a looped epitrochoidal path, as an inscribed projection upon the base of the receptacle; with the stationary blades of such a size and shape and so positioned within the looped epitrochoidal paths of the rotating vertical blades, and the rotating vertical blades of such a size and shape and so positioned that in one complete cycle the rotating vertical blades in their looped epitrochoidal paths pass adjacent to both the stationary blades and the side wall of the receptacle.

5. In an apparatus for mixing materials, the combination which comprises a receptacle with cylindrical side wall, a base affixed to the bottom of the side wall, and an outlet through the base; four blades affixed to the base of the receptacle and uniformly spaced between the vertical axis and the side wall of the receptacle; a rotating blade assembly comprised of four vertical blades; a means for supporting and driving the rotating blade assembly such that in one complete cycle of the assembly each of the vertical blades thereof moves in a looped epitrochoidal path; and a means for supporting and driving the receptacle in the direction opposite to the direction of rotation of the rotating blade assembly and at a speed synchronized with the speed of the blade assembly; with the blades affixed to the base of the receptacle of such a size and shape and so positioned within the looped epitrochoidal paths of the rotating vertical blades, as an inscribed projection upon the rotating base of the receptacle, the cross sections of all of the rotating blades cover substantially all the cross section of the interior of the cylindrical receptacle except that occupied by the blades affixed to the base of the receptacle.

6. In an apparatus for mixing materials, the combination which comprises a receptacle with cylindrical side wall, a base affixed to the bottom of the side wall, and an outlet through the base; a plurality of blades affixed to the base of the receptacle and uniformly spaced between the vertical axis and the side wall of the receptacle; a plurality of rotating blade assemblies with each comprised of a plurality of vertical blades; a means for supporting and driving each of the rotating blade assemblies such that in one complete cycle of each assembly each of the vertical blades thereof moves in a looped epitrochoidal path, as an inscribed projection upon the base of the receptacle; a means for supporting and driving the receptacle at a speed synchronized with the speed of the respective blade assemblies; with the blades affixed to the base of the receptacle of such a size and shape and so positioned within the looped epitrochoidal paths of the rotating vertical blades as an inscribed projection upon the rotating base of the receptacle, and the rotating vertical blades of such a size and shape and so positioned that in one complete cycle the rotating vertical blades in their looped epitrochoidal paths pass adjacent to both the blades affixed to the base of the receptacle and the wall of the receptacle.

7. In an apparatus for mixing materials, the combination which comprises a receptacle with cylindrical side wall, a base affixed to the bottom of the side wall, and an outlet through the base; a plurality of blades affixed to the base of the receptacle and uniformly spaced between the vertical axis and the side wall of the receptacle; at least one rotating blade assembly comprised of a plurality of vertical blades; and a means for maintaining the relative motion between the plurality of vertical blades of the rotating blade assembly in respect to the plurality of the blades affixed to the base of the receptacle such that in one complete cycle of the rotating blade assembly each of the vertical blades thereof moves in a looped epitrochoidal path, as an inscribed projection upon the base of the receptacle; with the blades affixed to the base of the receptacle of such a size and shape and so positioned within the looped epitrochoidal paths of the rotating vertical blades, and the rotating vertical blades of such a size and shape and so positioned that in one complete cycle of the rotating vertical blades in their looped epitrochoidal paths the cross sections of all of the rotating blades cover substantially all the cross section of the interior of the cylindrical receptacle except that occupied by the blades affixed to the base of the receptacle.

8. In an apparatus for mixing material, the combination which comprises a receptacle with side wall and a base affixed to the bottom of the side wall; a plurality of blades affixed to the base of the receptacle and uniformly spaced thereon; at least one rotating blade assembly comprised of a plurality of vertical blades; and a means for maintaining the relative motion between the plurality of vertical blades of the rotating blade assembly in respect to the plurality of the blades affixed to the base receptacle such that in one complete cycle of the rotating blade assembly each of the vertical blades thereof moves in a looped epitrochoidal path, as an inscribed projection upon the base of the receptacle; with the blades affixed to the base of the receptacle of such a size and shape and so positioned within the looped epitrochoidal paths of the rotating vertical blades, and the rotating vertical blades of such a size and shape and so positioned that in one complete cycle the rotating vertical blades, in their looped epitrochoidal paths, pass adjacent to the blades affixed to the base of the receptacle.

ROGER H. NEWTON.